UNITED STATES PATENT OFFICE.

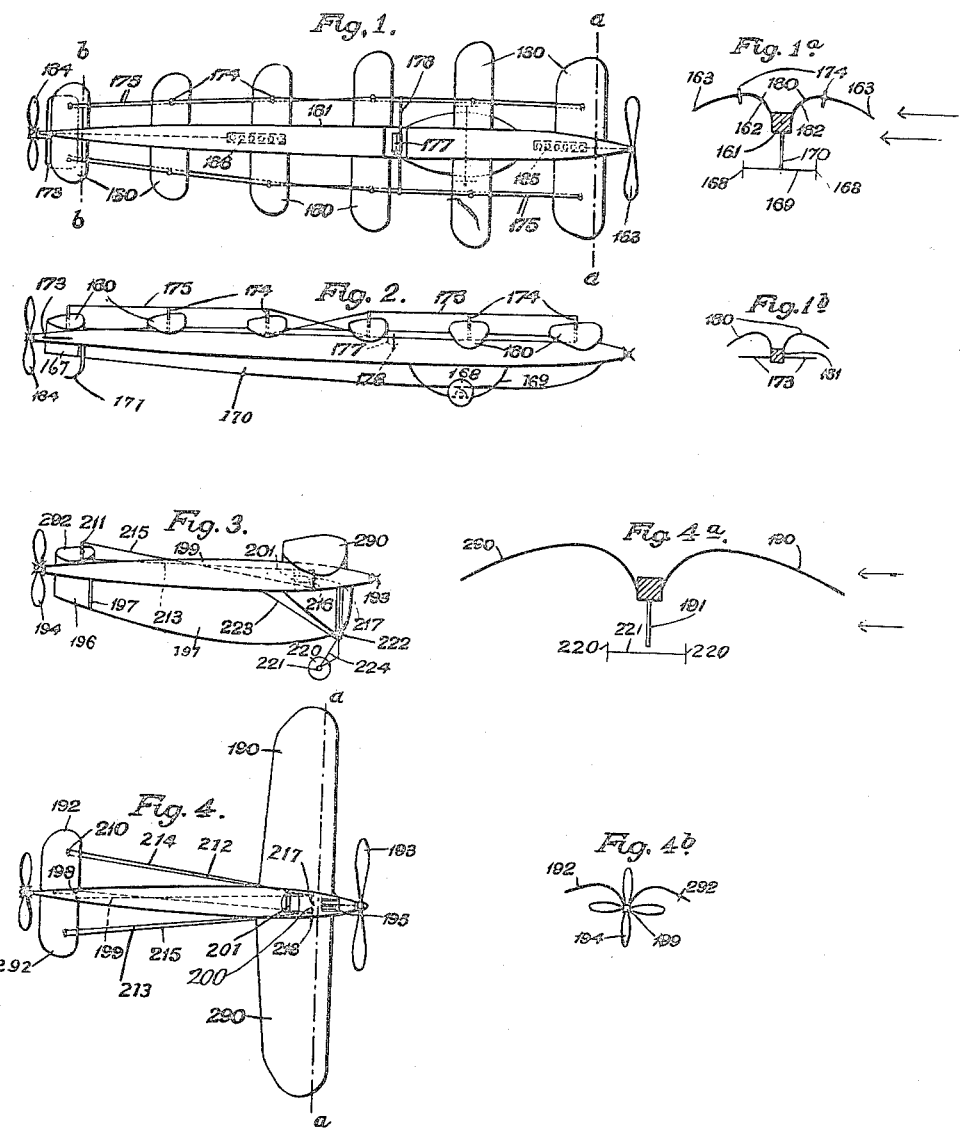

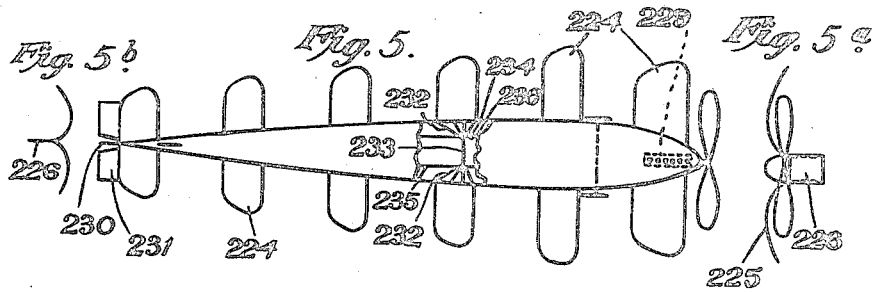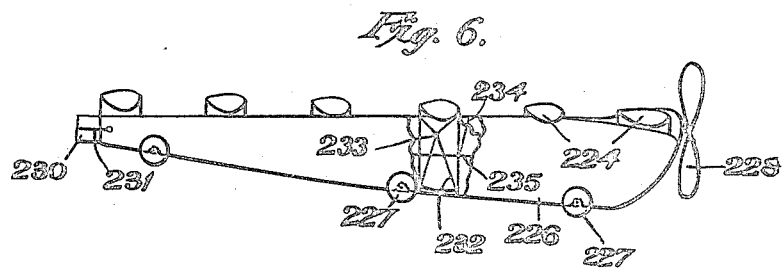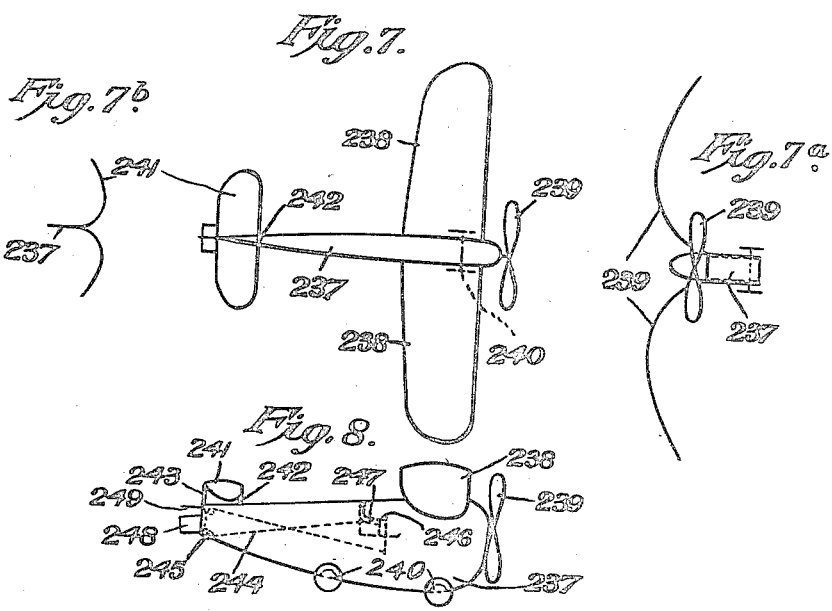

HOWARD HUNTINGTON, OF PRINCETON, NEW JERSEY, ASSIGNOR TO HUNTINGTON AIRCRAFT COMPANY, INC., OF GARDEN CITY, NEW YORK, A CORPORATION OF NEW YORK.

AEROPLANE.

1,173,191. Specification of Letters Patent. Patented Feb. 29, 1916.

Application filed May 9, 1913. Serial No. 766,556.

*To all whom it may concern:*

Be it known that I, HOWARD HUNTINGTON, a citizen of the United States, and a resident of Princeton, New Jersey, have invented certain Improvements in Aeroplanes, of which the following description, in connection with the accompanying drawings, is a specification, like characters on the drawings designating like parts.

This invention relates to apparatus for navigating fluid media, and is of particular utility when embodied in an aeronautical vehicle or device of the nature of an aeroplane, although I contemplate the use of my improvements in any field for which they are adapted by their nature, as for example in the navigation of streams or bodies of water, and upon solid surfaces, such as land or ice.

An important object of my invention is to provide for a high degree of lateral stability in such a device, and particularly to avoid the disturbing effect of lateral gusts of wind, or currents, which have heretofore been a source of great danger to the operators of aeroplanes constructed as have been the only devices of the character which have thus far made successful flights.

In order to accomplish the above object, and in contradistinction to the earlier types of aeroplanes just mentioned, I have devised a structure which I prefer to provide with an upright portion which may be approximately vertical, and an outwardly extended portion the general direction of which may be flatter toward its outer extremity, there being preferably two of these wings or surfaces arranged symmetrically with reference to the longitudinal axis of the apparatus, the upright portions preferably merging into the outwardly extended portions by an easy curve, which may be continued toward the free lateral edge of the wings, each of these edges being preferably slightly lower than the highest inward portion of the intermediate curved surface, to hold the air.

The "fuselage," body or principal longitudinal member extending flightwise of the aeroplane, may be of any suitable shape, size and material, and preferably will be made of some material having considerable rigidity, and very tough, to avoid breakage by lateral strains, whether accidental, or due to the weight of the operator and operating parts of the apparatus, inasmuch as I prefer to constitute this member the main support for the weights carried by the aeroplane, which in addition to the operator and other passengers will usually comprise one or more motors with their propellers, shafts, and other moving parts, the fuel supply and other supplies, and the steering and other controlling apparatus.

Among other important objects of my invention may be mentioned the provision of means to permit the control of the mechanisms for directing flight in vertical and horizontal directions, independently of each other, and yet to enable the operator to coordinate these movements at pleasure by interacting connections between the controlling mechanisms.

The various features of my invention will be illustrated and described fully in the accompanying drawings and specification and pointed out in the claims.

In the drawings, Figure 1 is a plan view of an "aericle," or device of the nature of an aeroplane, in the construction of which my improvements have been embodied; while Fig. 1$^a$ is a view in diagrammatic section, on the line $a$—$a$, Fig. 1; and Fig. 1$^b$ is a similar section on the line $b$—$b$, Fig. 1; Fig. 2 is a side elevation of the aeroplane shown in Fig. 1. Figs. 3 and 4 are a side elevation and plan view respectively of another form of the invention. Fig. 4$^a$ is a sectional view taken on line $a$—$a$, Fig. 4; and Fig. 4$^b$ is a rear end elevation. Figs. 5, 5$^a$, 5$^b$ and 6 are a plan view, a front end elevation, a rear end elevation and a side elevation, respectively, of a construction of machine somewhat similar to that shown in Figs. 1—2; and Figs. 7, 7$^a$, 7$^b$ and 8 are similar views of a machine of the type illustrated in Figs. 3 and 4, with modifications.

In the embodiment of my invention selected for illustration and description to enable ready and complete understanding of my improvements, and referring first to Figs. 1—2, the parts designated by the reference numerals 160 may be described for the sake of brevity as wings, a term which I use however without technical limitation, to signify portions of the member or members which in a device of the class described serve to resist displacement of the device from the desired position, or desired direction of progress, in the medium to be navigated, such as the air. In the preferred embodiment of my invention, these wings 160 comprise portions extending oppositely in a generally horizontal direction from an upright portion, designated in the figures under description by the numeral 170, and which in accordance with an important feature of my invention, in this preferred form, I have devised as means to insure stability of the device as a whole, with special reference to its ability to resist the capsizing action of lateral gusts, currents or other influences, sudden and momentary, or gradual and prolonged in duration. The overturning action of such a current works under the near edge of the device from beneath, usually, and the purpose of the upright portion 170 is to present, for engagement by the current, a surface of sufficient area to develop a countervailing pressure that will nullify the capsizing action completely, and in the drawings I have shown the surfaces so constructed and arranged that the effect of a lateral current coming in the direction of the arrows, Fig. 1ª, and impinging upon the portion 170, will be to turn the device around its longitudinal axis until it exposes to the action of the current the upper surface 174 of the wing at the portion farthest from the source of the current, and owing to the greater area exposed by this upper surface the pressure upon it balances quickly the tilting pressure on the upright portion and the requisite degree of equilibrium soon supervenes.

The dimensions, relative position, proportions, contour and material of the wings, may vary considerably according to the exigencies of the particular use of the apparatus in which my improvements are embodied, and in the construction of a device intended primarily to serve as an aeroplane such as that illustrated, I may, where speed is a desideratum, construct the wings of greater length along the path of flight than their combined width transversely with respect to the direction of movement of the device, thus diminishing the area of cross-sectional resistance to the air. In the instance illustrated in Figs. 1–7, the length of the wings is approximately three times their combined width, and I consider a length of fifty feet over all suitable for one size of the type of aeroplane herein illustrated.

In the embodiment of my invention selected for illustration and description in Figs. 1—2, I have shown a monoplane comprising six pairs of wings 160, arranged along a fuselage or longitudinal member 161, of any suitable material, structure and contour, preferably similar to a torpedo in general shape, or tapering forward and rearward in "stream-line" shape to permit a smooth passage through the air with minimum head resistance.

As indicated in Figs. 2 and 1ª, the wings 160 preferably have, as indicated in Figs. 1ª and 1ᵇ, the characteristic concave arch at 162 and flatter margin 163 which, in coöperation with the upright member 170, gives stability to the aeroplane, in accordance with my invention, as above described. Such an aeroplane may have any suitable propelling means, guiding means and alighting means, such as the two-blade propeller 163 and four-blade propeller 164, either or both, with suitable engines 165, 166, and the vertical rudder 167, and alighting wheels 168 with shock-absorbing devices such as the skids 169; also a rear skid 171.

For steering the aeroplane upward and downward, horizontal rudders may be provided, as at 173, or means may be provided to warp the wings to cause elevating and depressing effects, for which purpose I have shown masts 174, on the respective wings 160, connected by wires 175 running to a lever rock-shaft 176 near the operator's seat 177 and so arranged that when the operator draws the lever of the shaft 176 toward him the forward edges of the three forward pairs of wings 160 will be raised and the forward edges of the three rear pairs will be depressed and thus the aeroplane will be caused to describe an upward direction in its forward progress. By reversing the lever 176, pushing it forward, the operator will depress the forward edges of the forward pairs of wings 160 and elevate the forward edges of the rear pairs of wings and the aeroplane will be caused to take a downward direction in its forward progress.

The type of aeroplane just described is particularly designed to attain very high speeds.

In Figs. 3, 4, 4ª and 4ᵇ, I have illustrated a type of aeroplane embodying the characteristic arched wings 190, 290, 192, 292 and depending upright member 191, combined as seen best in Fig. 4ª to coöperate for stability in the manner above described, the length of the aeroplane flightwise relatively to its width being less, with fewer pairs of wings, and the supporting wings 190, 290 being of larger area proportionately to the size of the aeroplane as a whole. The fuselage 199 may be of any suitable shape, and material. This type of aeroplane also may have one or more propellers, front and rear, as at 193, 194, either or both, with the desired number of blades, and suitable engines, as indicated at 195; also suitable guiding means and alighting devices. I have shown for this purpose a vertical rudder 196, pivoted on a post 197 having a rudder head 198, from which steering wires 199 are extended forward to a tiller bar 200, in front of the operator's seat 201, and operable by the operator's feet.

For directing the aeroplane upward and downward, any suitable means may be provided, and I have shown for this purpose short masts, 210, 211, mounted on each of the wings 192, 292, of the rear pair, and by means of which the operator may warp the wings 192, 292, pulling on wires 212, 213, 214, 215, which extend from the masts to a rocking frame 216 mounted on a swivel pivot 217 in front of the operator's seat 201. By pushing forward the upper part of the swivel frame 216 the operator can draw the wires 212, 213, pulling on the lower part of masts 210, 211, and tilt up the forward edges of both wings 192 and 292, the effect being to cause the stern of the aeroplane to rise and direct its flight downward; and if the operator draws toward him the top of the swivel frame 216 he will pull on wires 214, 215, and tilt forward the tops of masts 210, 211, tilting downward the forward edges of wings 192, 292, and causing the stern of the aeroplane to be depressed, directing the flight upward. By movements of the swivel frame 216 sidewise while either of the above tilting movements of the swivel frame are being made, the front edge of one of the rear wings 192, 292, may be elevated while the front edge of the other is depressed, giving a twisting movement to the aeroplane as it turns a curve, in either direction. At 220 I have shown alighting wheels mounted on an axle 221 forming part of a chassis 222, provided with braces 223 and shock-absorbers 224, this constituting one convenient form of alighting device.

In Figs. 5, 5ª, 5ᵇ and 6 I have shown a type of aeroplane which in essential respects is similar to that shown in Figs. 1—2, having a series of pairs of wings 224, with the characteristic concave arch indicated at 225 in Fig. 5ª, with the depending upright flightwise member 226, coöperating to give stability against lateral currents of air, the upright member 226 taking, however, the form of an inclosed hull suitable to float upon water, being provided also with wheels 227 preferably to enable it to start and alight easily, and to run on a solid surface. One or more suitable propellers 228, and engines 229 may be provided; also suitable steering devices such as the vertical rudder 230 and horizontal rudder 231.

I have shown in connection with this type of aeroplane a modified arrangement for tilting the wings 224 which may be used advantageously in connection with other types of aeroplanes, the essential feature of this part of my invention being that the wing is of such construction as to permit the operator to tilt the wing bodily instead of warping the wing. For this purpose the wing may be made of any suitable construction and as one convenient form is shown as built with a frame 232 extending down within the hull 226, and mounted on a cross bar 233, a suitable operating handle 234 being provided to enable the operator to control the wings in multiple series, for which purpose they may be connected by wires 235, 236.

I have shown in Figs. 7, 7ª, 7ᵇ and 8 a type of aeroplane similar to that illustrated and described with reference to Figs. 4—5, but having a hull 237 suitable for floating the aeroplane on water, this hull 237 constituting an upright member coöperating with concavely arched supporting wings 238, in accordance with my invention, to impart stability in resistance to lateral currents of air. The reference numeral 239 designates a propeller, and 240 are alighting wheels. At 241 I have shown a rear pair of wings, with modified means for warping them to steer the aeroplane, and this feature may be applied to other types of aeroplanes. In accordance with this feature of my invention the front edge of the wings 241 is secured to an upright member 242 secured in the hull or fuselage 237, but having a certain degree of flexibility while the rear edge 243 comprises a post or member movable vertically to tilt the rear wings 241 relatively to their front edge. To cause this tilting movement suitable devices may be provided, as for example the wires 244 extended around pulleys 245 to a lever 246 near the seat 247 of the operator. This type of aeroplane may also have a vertical rudder 248 and horizontal rudder 249.

Having illustrated and described my invention thus fully, and suitable means by which it may be carried into effect, I wish it to be understood that I do not limit myself to the particular materials and forms of construction selected for illustration and description by way of example, nor, in general do I limit myself otherwise than as set forth in the claims read in connection with this specification.

What I claim as new, and desire to secure by Letters Patent is:—

1. An aeroplane having a stream-line fuselage constituting an upright stabilizing member extended flightwise with a multiplicity of laterally extended wings in twin sets separated from each other by lateral spaces and each provided with means to change the angular position of said wings relatively to said fuselage; said wings respectively presenting downwardly a concavely arched under surface on each side of said fuselage, with relatively flatter margins; and propelling means for said aeroplane.

2. An aeroplane comprising a fuselage formed as a hull to float upon water, and having a series of sets of wings springing laterally therefrom above the water-line, being arched respectively adjacent to said hull, and having relatively flatter margins.

Signed at New York, in the county and State of New York, this eighth day of May, 1913.

HOWARD HUNTINGTON.

Witnesses:
ALEXANDER C. PROUDFIT,
R. Z. MCCOLLOCH.